United States Patent
Nakaya et al.

(10) Patent No.: US 6,728,094 B2
(45) Date of Patent: Apr. 27, 2004

(54) TITANIUM OXIDE POWDER, METHODS OF MANUFACTURING THE SAME AND BARIUM TITANATE POWDER, DIELECTRIC CERAMIC, AND MULTILAYER CERAMIC CAPACITOR

(75) Inventors: Syunsuke Nakaya, Omihachiman (JP); Masami Yabuuchi, Yokaichi (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/085,068

(22) Filed: Mar. 1, 2002

(65) Prior Publication Data

US 2002/0135971 A1 Sep. 26, 2002

(30) Foreign Application Priority Data

Mar. 12, 2001 (JP) .................................... 2001-068424

(51) Int. Cl.[7] ................................................ H01G 4/06
(52) U.S. Cl. ............................... 361/321.2; 361/306.1; 361/311; 361/313
(58) Field of Search .................... 361/321.1, 321.4, 361/306.1, 311, 313, 321.5, 321.3, 301.4, 301.5, 320, 321, 312; 501/137, 138, 139

(56) References Cited

U.S. PATENT DOCUMENTS

| | | | |
|---|---|---|---|
| 4,803,591 A | * | 2/1989 | Miyashita et al. |
| 5,116,790 A | * | 5/1992 | Bruno et al. |
| 5,238,673 A | * | 8/1993 | Bruno et al. |
| 5,581,435 A | * | 12/1996 | Kinoshita et al. |
| 5,864,088 A | * | 1/1999 | Sato et al. |
| 6,055,151 A | * | 4/2000 | Tormey et al. |
| 6,126,743 A | * | 10/2000 | Saegusa et al. |
| 6,185,087 B1 | * | 2/2001 | Park et al. |
| 6,548,169 B2 | | 4/2003 | Tanaka et al. |
| 2002/0141139 A1 | * | 10/2002 | Nakamura et al. |
| 2003/0152772 A1 | | 8/2003 | Tanaka et al. |

FOREIGN PATENT DOCUMENTS

| | | |
|---|---|---|
| JP | 05-116943 | 5/1993 |
| JP | 08-119633 | 5/1996 |
| JP | 08-239215 | 9/1996 |

OTHER PUBLICATIONS

Gaku Kiyono, Titanium Oxide, Physical Properties and Application Techniques, Gihodo Publishers, 1991, p. 54 No Date.

Japanese translation of Reasons for Submission dated Oct. 14, 2003.

* cited by examiner

Primary Examiner—Dean A. Reichard
Assistant Examiner—Nguyen T. Ha
(74) Attorney, Agent, or Firm—Dickstein, Shapiro, Morin & Oshinsky, LLP.

(57) ABSTRACT

A titanium oxide powder holding a barium compound on the surface of the particles thereof is used for manufacturing a highly crystalline fine barium titanate powder by solid-phase reaction. When the titanium oxide powder and a barium-containing powder material are mixed and calcined to prepare the barium titanate powder, the barium compound on the surfaces of the titanium oxide powder particles inhibits the sintering, or the growth, of the titanium oxide during the calcination. Consequently, the resulting barium titanate powder is highly crystalline and fine.

11 Claims, 2 Drawing Sheets

TITANIUM OXIDE POWDER, METHODS OF MANUFACTURING THE SAME AND BARIUM TITANATE POWDER, DIELECTRIC CERAMIC, AND MULTILAYER CERAMIC CAPACITOR

BACKGROUND OF THE INVENTION

1. Field of the Invention

The present invention relates to titanium oxide and barium titanate powders, methods of manufacturing the same, dielectric ceramics and multilayer ceramic capacitors, and particularly to an improved method for preparing a highly crystalline fine barium titanate powder.

2. Description of the Related Art

Sintering a powder material mainly containing barium titanate results in a dielectric ceramic. The dielectric ceramic is used, for example, for forming dielectric ceramic layers included in multilayer ceramic capacitors.

For miniaturizing the multilayer ceramic capacitors and giving them high capacitance, it is effective to form thinner dielectric ceramic layers. In order to form thin dielectric ceramic layers, the barium titanate powder used for the dielectric ceramic layers needs to be finer.

Hydrothermal synthesis and hydrolysis have been suggested and put to practical use to readily obtain fine barium titanate powders, but these methods increase the cost of manufacturing the barium titanate powders. Accordingly, solid-phase reaction has been traditionally used for manufacturing barium titanate powders.

In the solid-phase reaction, starting materials, for example, a barium carbonate powder and a titanium oxide powder are mixed, pulverized with a medium, and then are calcined. For manufacturing finer barium titanate powder by solid-phase reaction, it is effective to pulverize titanium oxide powder or to use a much finer titanium oxide powder.

Unfortunately, while barium titanate is synthesized at temperatures of 1000 to 1200° C., titanium oxide is sintered at about 800° C. Hence, titanium oxide starts to be sintered, that is, grains grow, before the barium titanate starts to be synthesized. As a result, even when the fine titanium oxide powder is used, it cannot be effective enough to obtain a fine barium titanate powder.

SUMMARY OF THE INVENTION

Accordingly, it is an object of the present invention to provide a method of manufacturing a fine barium titanate powder by solid-phase reaction.

Another object of the present invention is to provide a titanium oxide capable of being advantageously used in the method of manufacturing the barium titanate powder and a method of manufacturing the titanium oxide powder.

Still another object of the present invention is to provide a dielectric ceramic prepared by sintering the barium titanate powder manufactured by the method of the present invention and a multilayer ceramic capacitor comprising the dielectric ceramic.

To this end, according to one aspect of the present invention, there is provided a titanium oxide powder comprising titanium oxide particles and a barium compound on the surfaces of the particles. Specifically, the titanium oxide powder has a layer mainly containing a barium compound with a predetermined thickness on the surfaces of the particles.

Preferably, the barium content of the titanium oxide powder is in the range of about 0.001 to 0.1 mol relative to 1 mol of titanium.

Another aspect of the present invention is directed to a method of manufacturing the titanium oxide powder described above.

The method comprises mixing a titanium oxide powder, a solvent and a barium-containing material soluble in the solvent to prepare a titanium oxide slurry. The solvent is removed from the slurry and the solvent-free mixture is heated so that a barium compound is present on the surfaces of the titanium oxide powder particles.

The barium compound stabilized on the surfaces of the particles in the heating step has a thickness of about 3 to 30 nm. The barium compound is in any one of three states depending on the heating temperature and the kind of barium-containing material.

The barium compound on the surfaces of the particles may be amorphous. A relatively low heating temperature of about 150° C. or less facilitates creating this state.

The barium compound may in an amorphous state mainly containing $BaCO_3$ on the surfaces of the particles. A medium heating temperature of about 150 to 600° C. facilitates creating this state.

At least a part of the barium compound is a reaction product with titanium oxide at the surfaces of the particles. A relatively high heating temperature of about 600° C. or more facilitates creating this state.

Another aspect of the present invention is directed to a method of manufacturing a barium titanate powder.

The method of manufacturing a barium titanate powder comprises mixing a titanium oxide powder comprising titanium oxide particles having a barium compound present on the surfaces of the particles and a powder containing barium to prepare a powdered mixture. Also, the powdered mixture is calcined.

Preferably, the barium content of the titanium oxide powder is in the range of about 0.001 to 0.1 mol relative to 1 mol of titanium in the method of manufacturing the barium titanate powder.

Preferably, the titanium oxide powder has a specific surface area of about 5 $m^2/g$ or more, and more preferably of about 10 $m^2/g$ or more in the method of manufacturing the barium titanate powder.

Another aspect of the present invention is directed to a dielectric ceramic comprising a powder material mainly containing a barium titanate powder prepared by the manufacturing method described above. The material powder is formed into a predetermined shape and is sintered.

Another aspect of the present invention is directed to a multilayer ceramic capacitor. The multilayer ceramic capacitor comprises a plurality of dielectric ceramic layers comprising the above dielectric ceramic and a plurality of internal electrodes. The internal electrodes extend along predetermined interfaces between the dielectric ceramic layers, and two opposing internal electrodes separated by one of the dielectric ceramic layers define a capacitor.

DESCRIPTION OF THE PREFERRED EMBODIMENTS

Figure 1:
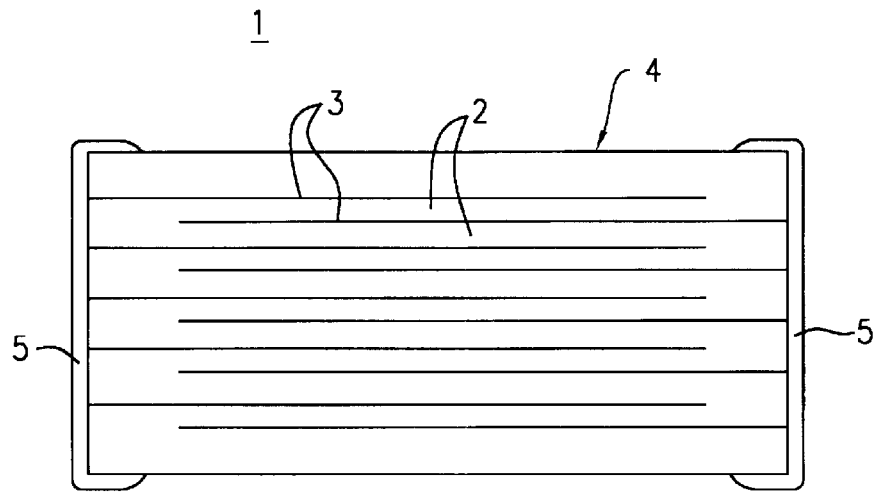
FIG. 1 is a schematic sectional view showing an internal structure of a multilayer ceramic capacitor of the present invention.

FIG. 1 is a schematic sectional view showing an internal structure of a multilayer ceramic capacitor 1 of the present invention.

The multilayer ceramic capacitor 1 comprises a laminate 4 having a plurality of laminated dielectric ceramic layers 2 and a plurality of internal electrodes 3 extending along some interfaces of the dielectric ceramic layers 2. The internal electrodes 3 are disposed so that two opposing internal electrodes 3 separated by a dielectric ceramic layer 2 form a capacitor.

External electrodes 5 are formed on both ends of the laminate 4 and each external electrode 5 is electrically connected with alternate internal electrodes 3; hence, the internal electrodes 3 are disposed in the laminating direction so as to be alternately connected with one external electrode 5 and the other external electrode 5.

A dielectric ceramic for forming the dielectric ceramic layers 2 is prepared by forming a powder material into a sheet and by sintering the sheet. The powder material mainly contains a barium titanate powder prepared from a titanium oxide powder of the present invention.

The barium titanate powder is prepared by mixing the titanium oxide powder of the present invention and a powder containing barium, such as barium carbonate, and by calcining the mixture according to achieve a solid-phase reaction. The resulting barium titanate may be pulverized, if necessary.

The titanium oxide powder used for preparing the barium titanate powder in the present invention has a barium compound on the surfaces of the particles thereof. Preferably, the titanium oxide powder contains about 0.001 to 0.1 mol of barium relative to 1 mol of titanium and has a specific surface area of about 5 m²/g or more.

The titanium oxide powder holding the barium compound on the surfaces of the particles thereof is prepared according to the following procedure.

A starting titanium oxide powder is mixed with a solvent and a barium-containing material soluble in the solvent to form a titanium oxide slurry. The solvent may be water or an organic solvent, such as ethanol. The barium-containing material may be barium alkoxide.

The solvent and other volatile constituents are removed from the titanium oxide slurry by, for example, spray drying to separate out a powdered mixture.

The powdered mixture is heated in a batch furnace or the like to stabilize a barium compound, such as barium oxide, on the surfaces of the titanium oxide particles. The stabilized barium compound forms into a film having a thickness of about 3 to 30 nm, and more preferably about 5 to 15 nm, on the surface of each titanium oxide particle.

The inventors have ascertained that the conformation of the barium compound on the surfaces of the titanium oxide powder particles depends on the temperature in the heating process of the powder described above.

Specifically, when the barium-containing material is barium alkoxide and the powdered mixture is heated at a relatively low temperature of about 150° C. or less, an amorphous barium compound, particularly amorphous barium oxide, is present on, that is, coats the surfaces of the titanium oxide powder particles.

When the barium-containing material is barium alkoxide and the powdered mixture is heated at a medium temperature of about 150 to 600° C., an amorphous barium compound mainly containing $BaCO_3$ is present on, that is, coats the surfaces of the titanium oxide powder particles. More specifically, crystalline $BaCO_3$ is present in an amorphous barium oxide phase. The carbon of the $BaCO_3$ is derived from $CO_2$ in the atmosphere, barium alkoxide and the solvent.

When the barium-containing material is barium alkoxide and the powdered mixture is heated at a relatively high temperature of about 600° C. or more, part of the barium compound is a reaction product with titanium oxide at the surfaces of the titanium oxide powder particles. More specifically, coating films mainly containing a product from a reaction of barium and titanium are formed at the surfaces of the titanium oxide powder particles.

The resulting titanium oxide powder holding the barium compound on the surfaces of the particles thereof can be pulverized with a dry mill or the like, and then is used for preparing a barium titanate powder.

The titanium oxide powder holding the barium compound is mixed with a powder material containing a barium compound, such as barium carbonate, to prepare a powder mixture. If wet blending is applied for preparing the powder mixture, the powder mixture is dried before use.

Next, the powder mixture is calcined, e.g., in a batch furnace, to synthesize barium titanate and thus results in a barium titanate powder. In this instance, the titanium oxide powder holding the barium compound on the surfaces of the particles thereof inhibits the sintering, the growth, of the titanium oxide. Thus, the resulting fine titanium oxide powder advantageously leads to a highly crystalline fine barium titanate powder.

Preferably, the titanium oxide powder contains about 0.001 to 0.1 mol of barium relative to 1 mol of titanium, as described above, to ensure the effect of the fine titanium oxide powder.

Preferably, the titanium oxide powder holding the barium compound has a specific surface area of about 5 m²/g or more to result in much finer barium titanate powder with a high yield.

The resulting barium titanate powder is pulverized by, for example, a dry mill if necessary.

Examples of the preparation of the barium titanate powder according to the present invention will now be described.

EXAMPLE 1

A barium titanate powder of Example 1 is prepared according to the following procedure.

First, a starting titanium oxide powder having a specific surface area of 30 m²/g was dispersed in ethanol to form a titanium oxide slurry. Barium alkoxide was added to the titanium oxide slurry such that the molar ratio of barium to titanium was 0.02 to 1, and wet-blended. Next, ethanol was removed from the mixture by spray drying to realize a powder containing titanium oxide and the barium compound.

The separated powder was heated at 300° C. for 2 hours in the atmosphere in a batch furnace, and then pulverized with a dry mill to obtain a titanium oxide powder of which the particles were coated with films with a thickness of 10 nm of amorphous barium oxide phases containing crystalline $BaCO_3$ grains.

Next, the resulting titanium oxide powder was wet-blended with a $BaCO_3$ powder having a specific surface area of 12 m²/g such that the molar ratio of barium to titanium was 1.000 to 1.

After being dried, the powder mixture is calcined in a batch furnace, and then was pulverized with a dry mill to obtain a barium titanate powder of the present invention.

Comparative Examples

In contrast, titanium oxide powders holding no barium components were used for preparing barium titanate powders in comparative examples. Comparative barium titanate powders were prepared, using Comparative Examples 1 and 2, from the titanium oxide powders having no barium compound and specific surface areas of 10 m²/g and 30 m²/g, respectively, using the same procedure as Example 1 except the barium alkoxide was not used.

Calcinations for synthesizing barium titanate in Example 1 and Comparative Examples 1 and 2 were each performed at various temperatures of 1000, 1050, and 1080° C. to produce three barium titanate powders having different specific surface areas for each example.

Figure 2:
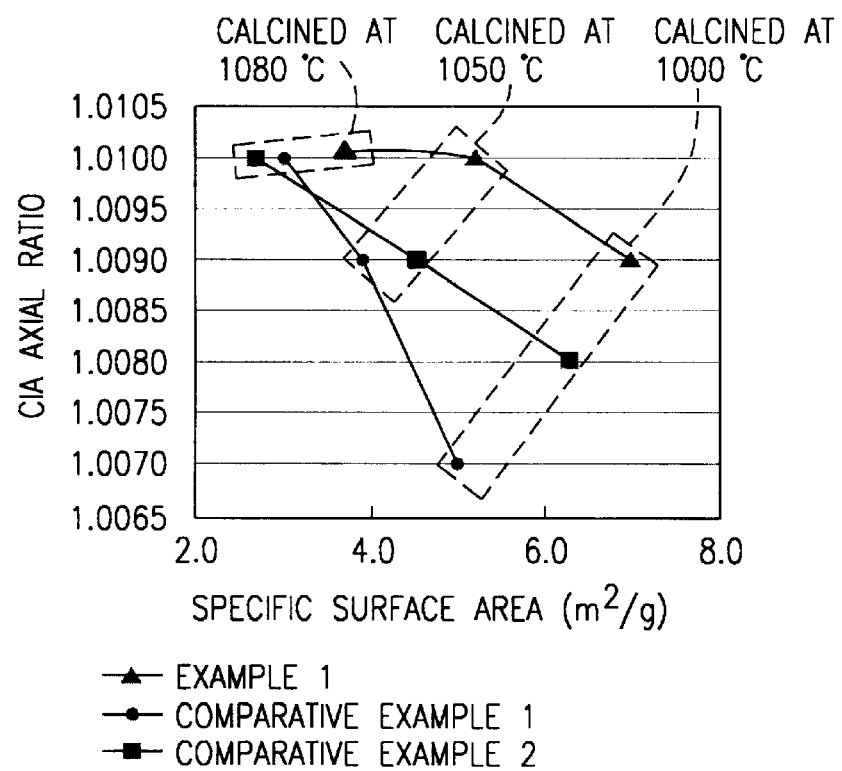
FIG. 2 is a graph showing c/a axial ratios and specific surface areas of barium titanate powders according to Example 1 and Comparative Examples 1 and 2.

The c/a axial ratios and the specific surface areas of the crystals for the resulting barium titanate powders were measured, and the results are shown in FIG. 2.

FIG. 2 shows that c/a axial ratios of the barium titanate powders of Example 1, in which the titanium oxide powder holding the barium compound on the surface of the particles thereof was used, are larger than those of Comparative Examples 1 and 2, in which titanium oxide powders holding no barium compound were used. Hence, the barium titanate powders of Example 1 are highly crystalline and have large specific surface areas, that is, have fine particles.

EXAMPLE 2

A starting titanium oxide powder having a specific surface area of 30 m²/g was dispersed in ethanol to form a titanium oxide slurry. Barium alkoxide was added to the titanium oxide slurry such that the barium contents were 0.0 (not added), 0.0005, 0.001, 0.02, 0.1, and 0.2 mol to 1 mol of titanium, and wet-blended.

These titanium oxide slurries resulted in barium titanate powders by use of the same procedure as Example 1.

Figure 3:
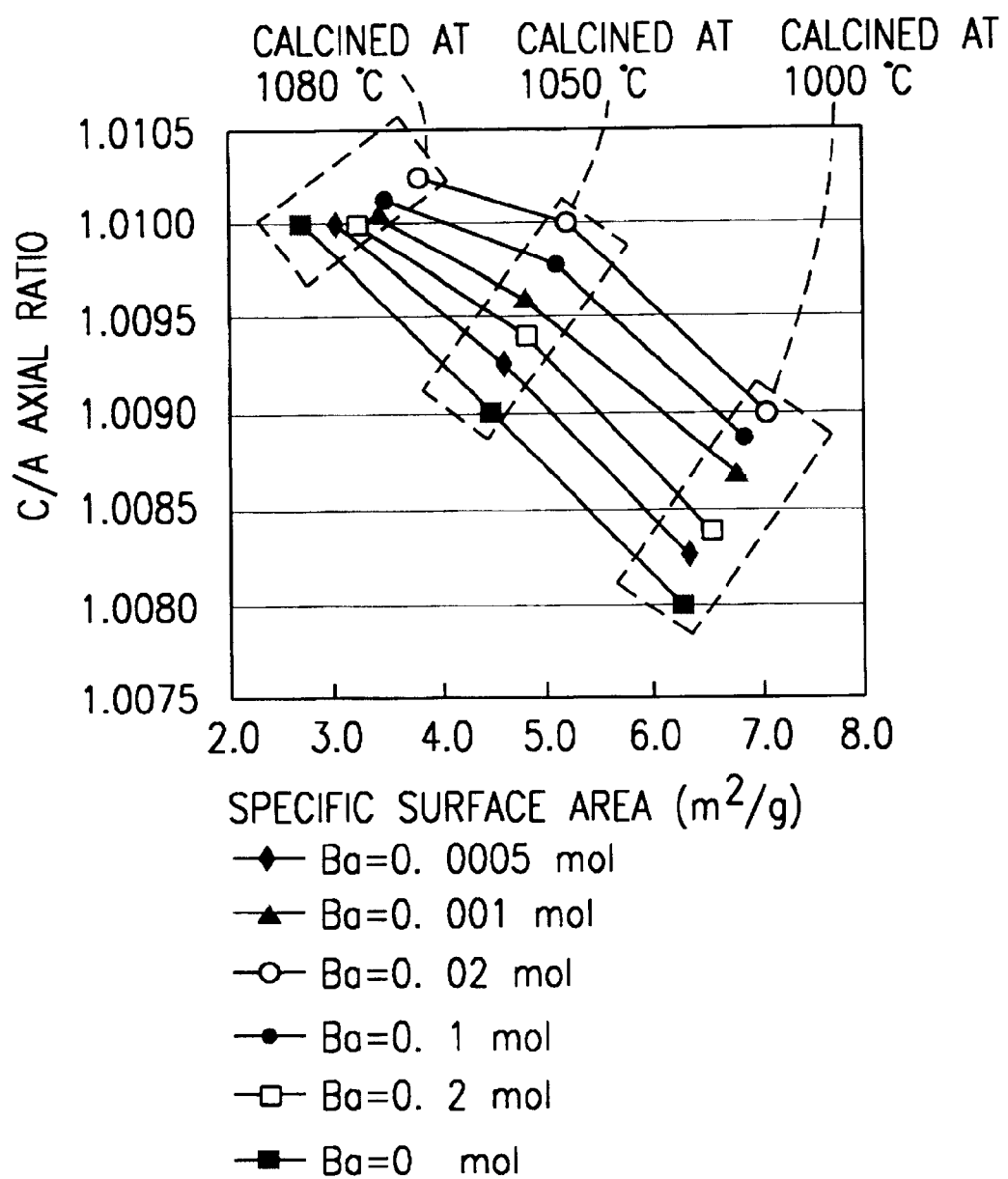
FIG. 3 is a graph showing c/a axial ratios and specific surface areas of barium titanate powders prepared from titanium oxide powders having various barium contents.

The c/a axial ratios and the specific surface areas of the crystals of the resulting barium titanate powders are shown in FIG. 3.

FIG. 3 suggests that titanium oxide powders holding the barium compound containing less than 0.001 mol and more than 0.1 mol of barium relative to 1 mol of titanium rarely result in highly crystalline barium titanate powders.

Hence, the barium content of the titanium oxide powder is preferably in the range of about 0.001 to 0.1 mol relative to 1 mol of titanium.

According to the present invention, a titanium oxide powder holding the barium compound on the surface of the particles thereof is provided. The barium compound may be amorphous, an amorphous state containing $BaCO_3$ or a product from a reaction with titanium oxide. When the titanium oxide holding the barium compound is used to synthesize barium titanate by solid-phase reaction and thus results in a barium titanate powder, the barium compound on the surfaces of the titanium oxide powder particles, which covers the surfaces of the particles, inhibits the sintering, or the growth, of titanium oxide. Thus, the resulting fine titanium oxide powder advantageously results in a highly crystalline and fine barium titanate powder at lower cost than those made by hydrothermal synthesis and hydrolysis.

By preparing the titanium oxide powder so as to contain about 0.001 to 0.1 mol of barium per mol of titanium, the effect of the fine titanium oxide powder can be ensured.

By using the titanium oxide powder holding the barium compound having a specific surface area of about 5 m²/g or more for preparing the barium titanate powder, much finer barium titanate powder can be obtained with a high yield.

In addition, by producing multilayer ceramic capacitors comprising a dielectric ceramic formed by sintering the materials mainly containing the barium titanate powder according to the present invention, the reliability of the multilayer ceramic capacitors is ensured even though dielectric ceramic layers become thinner in order to miniaturize the multilayer ceramic capacitors.

Various changes and modifications can be made in the process and products of this invention without departing from the spirit and scope thereof. The various embodiments disclosed herein were for the purpose of illustration only and were not intended to limit the invention.

What is claimed is:

1. A titanium oxide powder comprising titanium oxide particles having a layer of a barium compound of predetermined thickness on the surfaces of the particles.

2. A titanium oxide powder according to claim 1, wherein the barium content thereof is in the range of about 0.001 to 0.1 mol per mol of titanium.

3. A titanium oxide powder according to claim 2, wherein the specific surface area thereof is about 5 m²/g or more.

4. A titanium oxide powder according to claim 3, wherein the specific surface area thereof is about 10 m²/g or more.

5. A titanium oxide powder according to claim 1, wherein the barium compound on the surfaces of the particles is amorphous.

6. A titanium oxide powder according to claim 1, wherein the barium compound on the surfaces of the particles is in an amorphous state and comprises $BaCO_3$.

7. A titanium oxide powder according to claim 1, wherein at least part of the barium compound at the surfaces of the particles is a reaction product with titanium oxide.

8. A titanium oxide powder according to claim 1, wherein the specific surface area thereof is about 5 m²/g or more.

9. A titanium oxide powder according to claim 1, wherein the specific surface area thereof is about 10 m²/g or more.

10. In a multilayer ceramic capacitor comprising a plurality of dielectric ceramic layers; and a plurality of internal electrodes extending along predetermined interfaces between the dielectric ceramic layers, wherein two opposing internal electrodes separated by one of the dielectric ceramic layers to define a capacitor, the improvement which comprises the dielectric comprising a sintered barium titanate according to claim 1.

11. A titanium oxide powder according to claim 1, wherein the layer of barium compound has a thickness of about three to thirty μm.

* * * * *